United States Patent Office 3,236,030
Patented Feb. 22, 1966

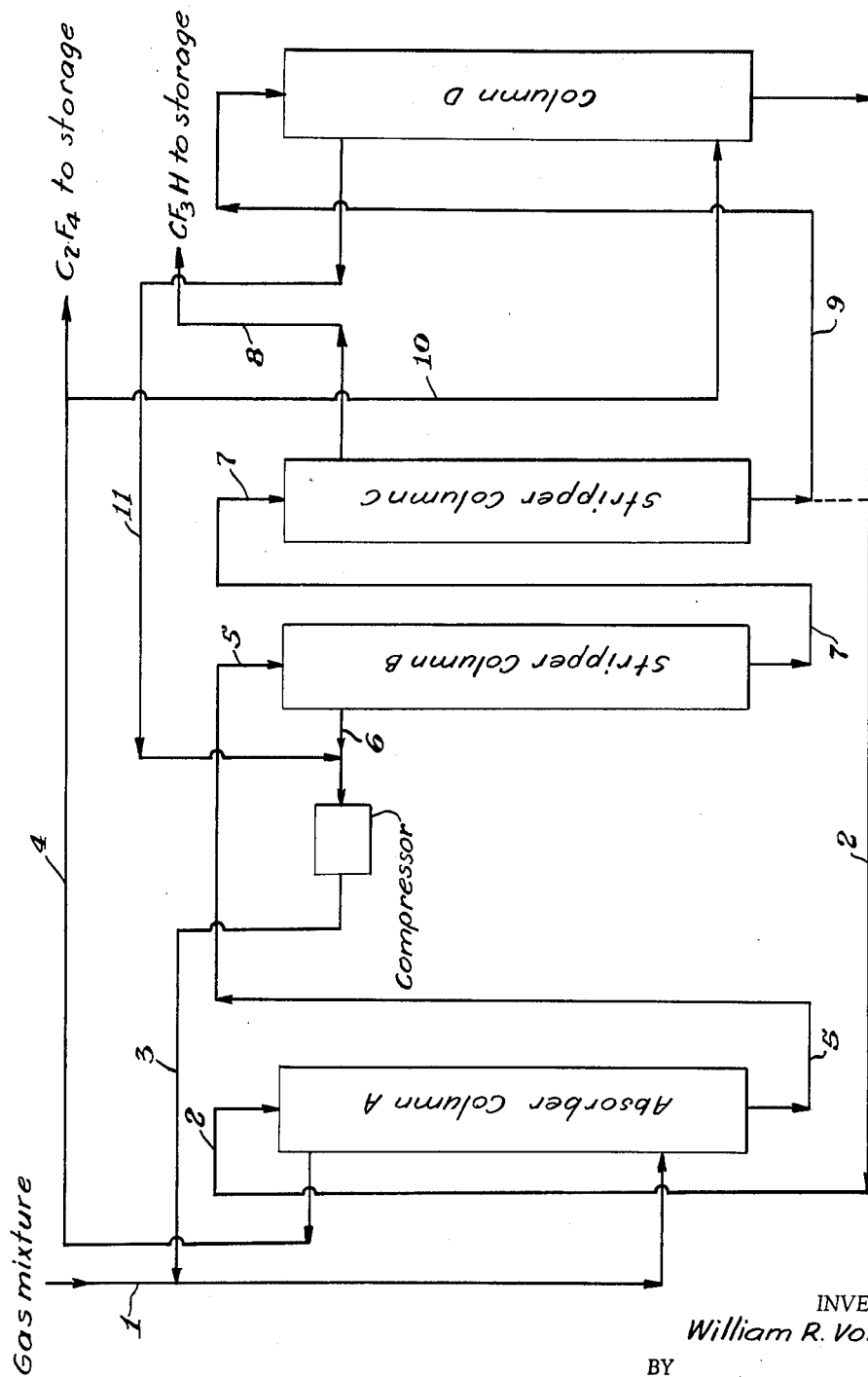

3,236,030
PROCESS FOR PREFERENTIALLY ABSORBING AND RECOVERING A FLUORINATED HYDROCARBON
William R. Von Tress, Lake Jackson, Tex., assignor to The Dow Chemical Company, Midland, Mich., a corporation of Delaware
Filed May 3, 1965, Ser. No. 456,023
6 Claims. (Cl. 55—44)

This application is a continuation-in-part of application Serial No. 275,453, filed April 24, 1963.

This invention relates to a novel chemical recovery process and more particularly is concerned with a novel process for separating and recovering fluoroform and tetrafluoroethylene from a gaseous mixture of these components.

Fluoroform ($CF_3H$) and tetrafluoroethylene ($C_2F_4$) each are valuable and useful materials. Ordinarily these both are formed by traditional fluorinating techniques employed in fluorocarbon preparation and as produced are present as a difficultly separable mixture.

Separation of these two materials by distillation, even under closely controlled conditions, is difficult because of the small temperature differential between their boiling points. $CF_3H$ has a normal boiling point of $-82.1°$ C. and $C_2F_4$ boils at $-76.3°$ C. under standard conditions of temperature and pressure.

Separation of the two compounds by use of solid adsorbents is impractical as the $C_2F_4$ tends to polymerize on the adsorbent thereby rendering it unreactive.

Now, unexpectedly the present novel process provides a ready way for effectively and efficiently separating a mixture of fluoroform and tetrafluoroethylene into the respective components and provides for recovery of the separated materials.

It is a principal object of the present invention to provide a novel process for separating and recovering fluoroform and tetrafluoroethylene from a mixture of these materials.

It is another object of the present invention to provide an efficient process for separating $CF_3H$ and $C_2F_4$ which provides for high volume separation of the components with relatively small sized processing equipment and with low recycle loads.

These and other objects and advantages readily will become apparent from the detailed description of the invention presented hereinafter when read in conjunction with the drawing.

The figure of the drawing shows schematically one embodiment of an illustrative process of the present invention.

In general, the present novel process comprises providing a mixture of $C_2F_4$–$CF_3H$, contacting this mixture with a sorber liquid having a high solubility for one of the mix components, preferably hexamethylphosphoric triamide, thereby to preferentially dissolve this component into the liquid, separating the resultant liquid and gaseous phases, the gaseous phase being depleted in the dissolved member, and, stripping the sorbed member from the liquid carrier.

The lower temperature of operation of the process is the freezing point of the absorbing liquid and the upper temperature is defined by (1) the boiling point of the gas absorbing liquid, (2) the lowest temperature where thermal degradation of any reaction component occurs or (3) the lowest temperature at which irreversible reaction occurs between components.

Although the absorbing stage of the process can be carried out at atmospheric pressure, ordinarily this step is carried out at elevated pressures and at low temperatures to promote the dissolution of the more soluble gas member in the liquid. Pressures of from about 20 to about 150 pounds per square inch gauge preferably are employed and temperatures of from about minus 15° C. to about 35° C. usually are maintained for the sorbing stage.

The amount of sorber liquid to be employed is not critical although for most efficient operation a minimum amount at least equal to that required to dissolve the more soluble gas member present, and preferably a quantity of liquid in excess to this amount, is employed. The maximum amount to be used is determined by the material handling and storage facilities. However, as was set forth hereinbefore an advantage of the present novel process is that excellent separations are achieved with relatively small volumes of sorber liquid.

Stripping of the dissolved gaseous member from the liquid is facilitated by lower pressures, e.g., atmospheric, and elevated temperatures of from about 50° C. up to a point below which detrimental thermal degradation of the liquid occurs.

Liquid absorbers, i.e., stripping solvents, for the $CF_3H$ or $C_2F_4$ materials suitable for use in the instant process are those organic liquids wherein the ratio of the Bunsen coefficients of the more soluble of the gas members, $CF_3H$ or $C_2F_4$, to the less soluble of the two in the liquid is at least about 6 and preferably is a minimum of about 10. The Bunsen coefficient, as is understood in the art, is the volume of gas reduced to 0° C. and 1 atmosphere pressure, dissolved by a unit volume of a solvent at the temperature of the experiment under a partial pressure of one atmosphere of the gas.

The Bunsen coefficients of $CF_3H$ and $C_2F_4$ in a number of suitable solvents which are operable in the present process are presented in Table I which follows:

TABLE I

| Absorber Liquid | Bunsen Coefficient | | |
|---|---|---|---|
| | $CF_3H$ | $C_2F_4$ | Ratio |
| Hexamethylphosphoric triamide | 37.3 | 1.0 | 37.3 |
| Octamethylphosphoramide | 20.8 | 0.6 | 34.7 |
| Dimethyl formamide | 10.5 | 0.9 | 11.7 |
| Dimethylether tetraethylene glycol | 8.9 | 0.7 | 12.7 |

The present process can be carried out in batch, cyclic, or continuous operations. Material handling, storage, transfer and contact equipment can be fabricated from any constructional material that has the requisite strength and corrosion resistance to stand up under the reaction conditions and not be detrimentally attacked by the reactant materials employed.

The following example will serve to further illustrate the present invention but is not meant to limit it thereto.

Example

A process assembly was set up as shown schematically in the figure.

A gas mixture containing about 10 volume percent $C_2F_4$, about 90 volume percent $CF_3H$, and about 1 percent $N_2$ was fed into the absorber-stripper assembly at a rate of about 10 cubic feet of gas mixture per hour. Hexamethylphosphoric triamide was employed as the gas absorber liquid, its flow through the system being about 1100 cubic centimeters per minute.

In this illustrative embodiment, the tubular contactors and strippers (columns A, B, C and D) were fabricated from 4-inch diameter steel pipe and each of these columns was about seven feet long. Each column was packed with ⅜-inch Berl saddles.

In the actual operation of the process, hexamethylphosphoric triamide was fed into the top of column A by means of transfer line 2 this column being maintained at about 25° C. and a pressure of about 25 pounds per square inch gage. Fresh gas mixture, line 1, plus recycle $C_2F_4$ stream carried in transfer line 3 was fed into column A near the bottom. The gaseous and liquid phases flowed countercurrently through absorber column A, whereby $CF_3F$ was preferentially dissolved in the hexamethylphosphoric triamide, the $C_2F_4$ and nitrogen exiting from the top of the reactor. This overhead $C_2F_4$ product was carried away by means of line 4. The liquid bottoms consisted of the absorber liquid saturated with $CF_3H$ and contained a small amount of $C_2F_4$. The bottoms were transferred (conduit 5) to stripping column B maintained at about 1 atmosphere and about 60° C. A small portion of the $CF_3H$ and substantially all of the remaining $C_2F_4$ were stripped from the absorber liquid as the mixture passed downwardly through this column. This $C_2F_4$ rich stream was removed near the top of the column, the actual degree of stripping being determined by the $C_2F_4$ concentration limitation specified for the $CF_3H$ product.

The so-stripped $C_2F_4$-$CF_3H$ mixture was cycled by means of transfer line 6, through a compressor and used as make up material being passed to the feed stream through transfer line 3.

The liquid sorber containing the bulk of the $CF_3H$ was withdrawn from the bottom of column B and fed through conduit 7 into stripper column C, passing downward through this column while being maintained at a temperature of from about 90 to about 120° C. and a pressure of about 1 atmosphere. The $CF_3H$ product was transferred to storage by means of conduit 8.

The substantially $CF_3H$ free sorber liquid was fed through line 9 to stripper column D. In this column, as the hexamethylphosphoric triamide containing the small amount of $CF_3H$ flowed downwardly through the column D at about the same temperature and pressure as was present in column C, the liquid was contacted countercurrently with a small amount of $C_2F_4$ taken from product stream 4 and fed through line 10 into column D thereby to strip from the sorber liquid the small amount of $CF_3H$ remaining therein. The resulting overhead $C_2F_4$-$CF_3H$ gas mixture was transferred by means of line 11 to the compressor where it was joined with the recycle stream from stripper column B and fed from there through line 3 to the absorber column A. The substantially gas free liquid absorber was removed from the bottom of stripper column D and fed through line 2 back to absorber column A.

Alternatively, if desired the substantially $CF_3H$ free hexamethylphosphoric triamide can be recycled directly from column C through line 2 to absorber column A.

The separated gas product off-stream recovered directly from absorber column A contained about 90 volume percent $C_2F_4$, about 10 volume percent nitrogen and only about 0.2 volume percent $CF_3H$. The $CF_3H$ product from stripper column C was found to contain less than about 0.1 volume percent $C_2F_4$.

Although as set forth herein, the present process has been directed to the separation of $CF_3H$ from $C_2F_4$ and a mixture of $C_2F_4$ and $N_2$ gases, it is to be understood that the process also can be used to separate $CF_3H$ from $O_2$, $CO_2$, CO, $C_3F_6$, c-$C_4F_8$, $C_2F_6$ and from mixtures thereof.

In a manner similar to that described for the foregoing example octamethylphosphoramide, dimethyl formamide and dimethylether tetraethylene glycol can be used to separate fluoroform from tetrafluoroethylene.

Various modifications can be made in the present process without departing from the spirit or scope thereof for it is understood that I limit myself only as defined in the appended claims.

I claim:

1. A process for separating fluoroform and tetrafluoroethylene components from a mixture of gases containing these members which comprises;
    (a) providing a gaseous mixture containing fluoroform and tetrafluoroethylene,
    (b) contacting said mixture with an absorbent liquid selected from the group consisting of hexamethylphosphoric triamide, octamethylphosphoramide, dimethyl formamide and dimethyl ether tetraethylene glycol and preferentially dissolving said fluoroform in said absorbent liquid,
    (c) separating the resultant liquid and gaseous phase, said gaseous phase being depleted in the fluoroform and
    (d) recovering the absorbed fluoroform from the absorbent liquid.

2. A process for separating fluoroform and tetrafluoroethylene which comprises;
    (a) providing a gaseous mixture of fluoroform and tetrafluoroethylene,
    (b) contacting said mixture with hexamethylphosphoric triamide absorbent liquid to preferentially dissolve said fluoroform therein,
    (c) separating said gaseous tetrafluoroethylene from said hexamethylphosphoric triamide containing said fluoroform, and
    (d) recovering said fluoroform from said hexamethylphosphoric triamide.

3. The process as defined in claim 2 wherein the contacting of said gaseous mixture and said hexamethylphosphoric triamide is carried out at a temperature of from about minus 15° C. to about 35° C. and at a pressure of from about 20 to about 150 pounds per square inch gage, and wherein the recovering of said fluoroform from said hexamethylphosphoric triamide is carried out at about atmospheric pressure and within a temperature range of from about 50° C. up to that temperature at which no detrimental thermal degradation of the hexamethylphosphoric triamide occurs.

4. A process for separating fluoroform and tetrafluoroethylene which comprises;
    (a) contacting a mixture of fluoroform and tetrafluoroethylene with hexamethylphosphoric triamide at a temperature of about 25° C. and a pressure of about 25 pounds per square inch gage to preferentially dissolve said fluoroform in said hexamethylphosphoric triamide,
    (b) separating the substantially fluoroform free gaseous tetrafluoroethylene from the solution of fluoroform in said hexamethylphosphoric triamide,
    (c) passing said solution through a stripper column maintained at a temperature of about 60° C. and about 1 atmosphere thereby to remove the small amount of residual tetrafluoroethylene contained therein from said solution,
    (d) passing said solution of substantially tetrafluoroethylene-free fluoroform containing hexamethylphosphoric triamide through a second stripper column at a temperature of from about 90 to about 120° C. and at about 1 atmosphere to separate said fluoroform from said hexamethylphosphoric triamide, and
(e) recovering said fluoroform.

5. The process as defined in claim 4 and including the step of recycling the hexafluorophosphoric triamide to said absorber column.

6. The process as defined in claim 4 and including the step of contacting the substantially fluoroform free stripped hexamethylphosphoric triamide with a small amount of tetrafluoroethylene to remove the remainder of the fluoroform therefrom and recycling the so-treated hexamethylphosphoric triamide to said absorber column.

References Cited by the Examiner

UNITED STATES PATENTS

| | | | |
|---|---|---|---|
| 2,623,611 | 12/1952 | Levine et al. | 55—63 |
| 3,002,586 | 10/1961 | Rabourn | 260—551 |
| 3,101,304 | 8/1963 | Wiist | 260—653 X |

OTHER REFERENCES

Mellan I.: Source Book of Industrial Solvents, N.Y., Reinhold Publishing, Inc., 1957, vol. II, pages 57, 81.

REUBEN FRIEDMAN, *Primary Examiner.*